United States Patent [19]

Koller et al.

[11] 4,116,622

[45] Sep. 26, 1978

[54] DYEING PREPARATIONS AND PROCESS FOR DYEING POLYACRYLONITRILE MATERIAL IN STRONG, NEUTRAL, CLEAR BLUE SHADES

[75] Inventors: Josef Koller, Reinach; Stefan Koller, Ramlinsburg, both of Switzerland

[73] Assignee: Ciba-Geigy Corporation, Ardsley, N.Y.

[21] Appl. No.: 704,271

[22] Filed: Jul. 12, 1976

[30] Foreign Application Priority Data

Jul. 17, 1975 [CH] Switzerland .................... 9356/75
Jun. 1, 1976 [CH] Switzerland .................... 6856/76

[51] Int. Cl.² .......................... D06P 1/00; D06P 3/70
[52] U.S. Cl. ............................................. 8/25; 8/76; 8/177 AB
[58] Field of Search .................... 8/25, 177 AB, 76

[56] References Cited

U.S. PATENT DOCUMENTS

| B 458,060 | 1/1976 | Reinehr et al. | 8/17 |
| 3,974,178 | 8/1976 | Ohkawa et al. | 8/84 |

FOREIGN PATENT DOCUMENTS

| 2,224,587 | 10/1974 | France. |
| 2,182,902 | 12/1973 | France. |
| 1,165,790 | 3/1964 | Fed. Rep. of Germany. |
| 2,525,113 | 1/1976 | Fed. Rep. of Germany. |
| 1,569,604 | 9/1971 | Fed. Rep. of Germany. |
| 49-4,718 | 1/1974 | Japan. |
| 380,698 | 10/1964 | Switzerland. |

*Primary Examiner*—A. Lionel Clingman
*Attorney, Agent, or Firm*—Edward McC. Roberts; Prabodh I. Almaula

[57] ABSTRACT

A process for dyeing polyacrylonitrile materials in clear, neutral blue shades, which comprises the use of a mixture of an oxazine dye of the formula

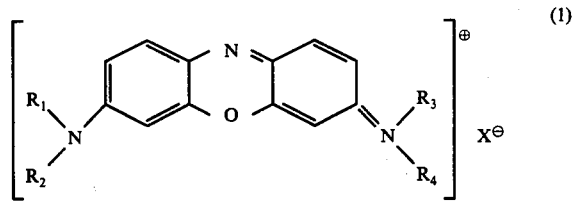

(1)

and a naphtholactam dye of the formula

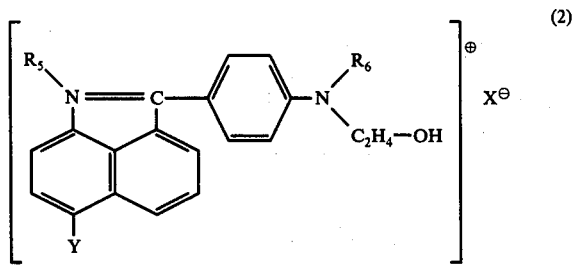

(2)

in the ratio of 1:3 to 3:1, in which formulae $R_1$ and $R_2$ represent low molecular alkyl radicals, $R_3$ represents a low molecular alkyl radical or an aryl radical, $R_4$ represents hydrogen or a low molecular alkyl radical, each of $R_5$ and $R_6$ represents a low molecular alkyl radical, Y represents a halogen atom and $X^\ominus$ represents an anion and a dyestuff preparation which contains an oxazine dye of the formula (1) and a naphtholactam dye of the formula (2) in the ratio 1:3 to 3:1.

7 Claims, No Drawings

DYEING PREPARATIONS AND PROCESS FOR DYEING POLYACRYLONITRILE MATERIAL IN STRONG, NEUTRAL, CLEAR BLUE SHADES

Hitherto it has not been possible to obtain strong, clear and neutral blue shades in satisfactory quality on polyacrylonitrile materials with the commercially available dyes. Depending on the class of dye, the following disadvantages have to be tolerated:
- azo dyes do not give blue dyeings which are fast to decatising;
- anthraquinone dyes have an insufficient build-up capacity: deep dyeings (over 1/1 standard type strength) cannot therefore be obtained;
- oxazine dyes have in general only a moderate lightfastness.

These disadvantages are not overcome even with the mixtures currently available. To illustrate this, for example, a mixture of an oxazine and a triphenylmethane dye still has an insufficient lightfastness and mixtures of oxazines and anthraquinones have in general a poor build-up.

It has not been found that, surprisingly, clear and neutral blue shades of excellent lightfastness and fastness to decatising are obtained on polyacrylonitriles materials by using a mixture of an oxazine dye of the formula

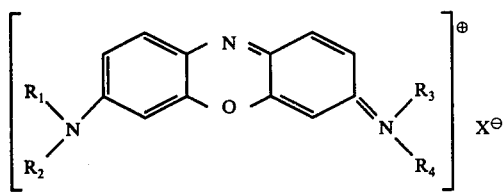

and a naphtholactam dye of the formula

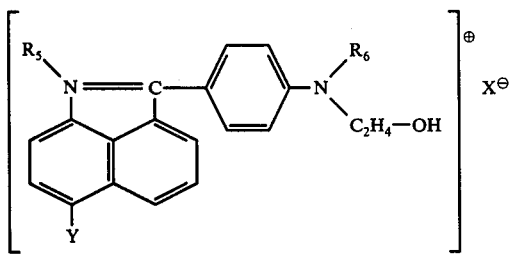

in the ratio of 1:3 to 3:1, in which formulae $R_1$ and $R_2$ represents low molecular alkyl radicals, $R_3$ represents a low molecular alkyl radical or an aryl radical, $R_4$ represents hydrogen or a low molecular alkyl radical, each of $R_5$ and $R_6$ represents a low molecular alkyl radical, Y represents a halogen atom and $X^{\ominus}$ represents an anion.

These dyes are known. The oxazine dye is obtained for example by the processes described in German Offenlegungsschrift No. 1,569,604, and the naphtholactam dye is obtained in accordance with Swiss patent application No. 7806/74.

Preferably an oxazine dye of the formula (1) is used, wherein $R_1$, $R_2$, $R_3$ and $R_4$ represent methyl or, in particular, ethyl, since these dyes can be particularly easily obtained. Preferred naphtholactams of the formula (2) are those wherein Y is a bromine atom and $R_5$ is methyl or ethyl and $R_6$ is ethyl.

The ratio is preferably so chosen that the naphtholactam dye comprises half to two thirds of the mixture.

The mixture of the present invention yields dyeings on polyacrylonitrile which are neutral blue in colour both in daylight and in artificial light. In this respect the mixture is superior to the individual dyes. In addition, the mixture has a good build-up capacity and the dyeings have good lightfastness and good fastness to decatising. Furthermore, both dyes have similar combination characteristics, so that no changes in shade result during the dyeing procedure and readily reproducible dyeings are always obtained.

The dyeings also have good general fastness properties, for example fastness to washing, perspiration, sublimation, creasing, decatising, kier-boiling, ironing, rubbing, carbonising, acid water, chlorinated water, sea water, dry cleaning, cross-dyeing, and solvents.

The dye mixture of this invention is suitable also for dyeing finished polyacrylonitrile fibres which can be, for example, in the form of flocks, yarns or wovens or knitted textiles, and also for spinning solution dyeing or for dyeing in the hydrated state, i.e. for dyeing wet-spun polyacrylonitrile material between spinneret and drier. In this utility, the mixture of the present invention is particularly characterised by its good resistance to thiocyanate.

The following Examples illustrate the invention, the parts and percentages being by weight.

EXAMPLE 1

0.228 part of the dye of the formula

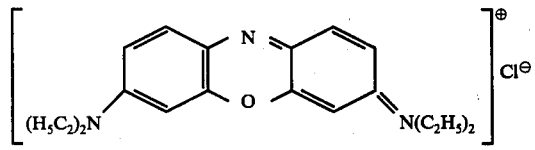

and 0.35 part of the dye of the formula

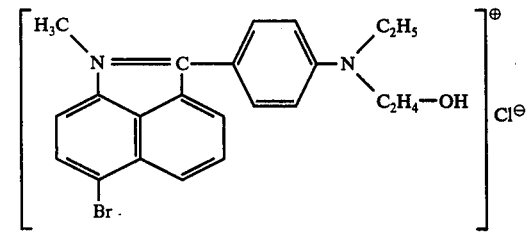

are dissolved in 200 parts of water with the addition of 4 parts of 40% acetic acid, 1 part of sodium acetate crystals and 10 parts of anhydrous sodium sulphate. Into this dyebath are put 100 parts of dried yarn of polyacrylonitrile staple fibre at 60° C, the temperature is raised to 100° C within half an hour and dyeing is carried out at the boil for 1 hour. The dyed fabric is then thoroughly rinsed and dried.

A lightfast, strong, neutral blue dyeing is obtained, which has a good evening shade and is fast to decatising.

EXAMPLE 2

A polyacrylonitrile copolymer consisting of 93% of acrylonitrile and 7% of vinyl acetate is dissolved to 15% in dimethyl acetamide. The spinning liquid is extruded in a spinning bath which consists of 40% of dimethyl acetamide and 60% of water. The resultant spinning cable is subsequently stretched and freed from dimethyl acetamide by rinsing with hot and cold water.

This wet spinning cable is coloured by immersing it in a bath which has been adjusted with acetic acid to a pH of 4.5 and which contains, per liter of water, 3 g of the dye of the formula

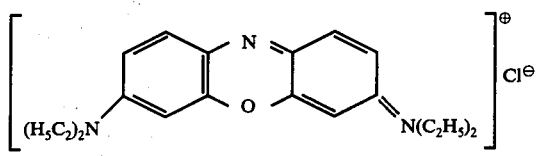

and 6 g of the dye of the formula

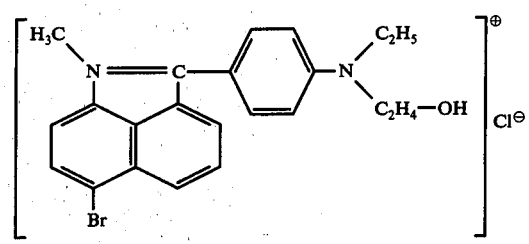

The contact time of the fibre cable in the dye liquor is 2 seconds. The excess dye liquor is subsequently squeezed out and the spinning cable is conveyed to the drier. A fibre cable is obtained which is coloured a deep blue of good fastness properties.

We claim:

1. A process for dyeing polyacrylonitrile in clear, neutral blue shades, which comprises the use of a mixture of an oxazine dye of the formula

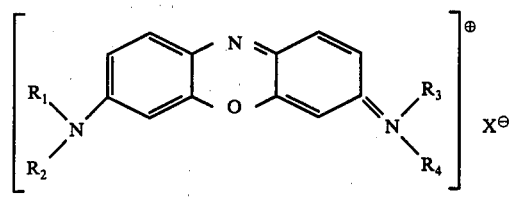

and a naphtholactam dye of the formula

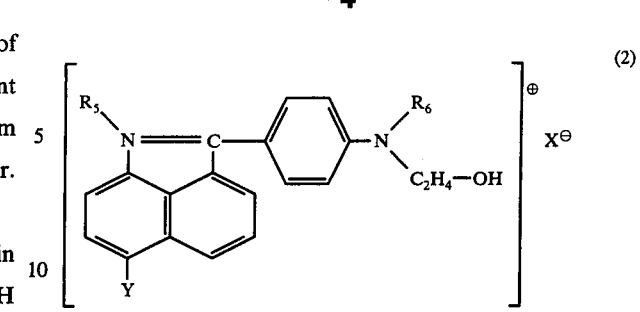

in the ratio of 1:3 to 3:1, in which $R_1$ and $R_2$ represent low molecular alkyl radicals, $R_3$ represents a low molecular alkyl radical or an aryl radical, $R_4$ represents hydrogen or a low molecular alkyl radical, each of $R_5$ and $R_6$ represents a low molecular alkyl radical, Y represents a halogen atom and $X^\ominus$ represents an anion.

2. A process according to claim 1, which comprises the use of an oxazine dye of the given formula, wherein $R_1$, $R_2$, $R_3$ and $R_4$ represent methyl or ethyl.

3. A process according to claim 1, which comprises the use of a naphtholactam dye of the given formula, wherein Y is a bromine atom.

4. A process according to claim 1, which comprises the use of a naphtholactam dye of the given formula, wherein $R_5$ represents methyl or ethyl and $R_6$ represents ethyl.

5. A process according to claim 1, wherein the ratio of oxazine dye to naphtholactam dye is kept between 1:2 and 1:1.

6. The material dyed according to claim 1.

7. A dyestuff preparation which contains an oxazine dye of the formula

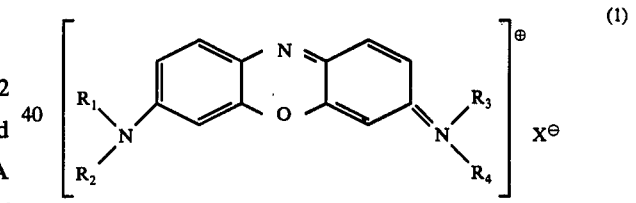

and a naphtholactam dye of the formula

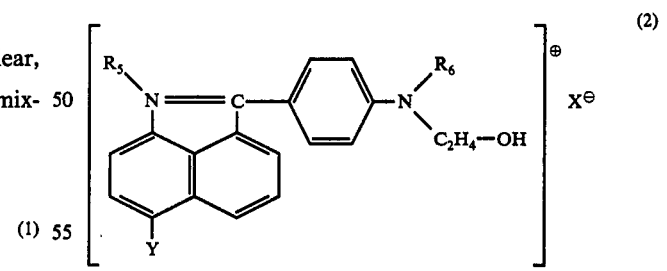

in the ratio of 1:3 to 3:1, in which $R_1$ and $R_2$ represent low molecular alkyl radicals, $R_3$ represents a low molecular alkyl radical or an aryl radical, $R_4$ represents hydrogen or a low molecular alkyl radical, each of $R_5$ and $R_6$ represents a low molecular alkyl radical, Y represents a halogen atom and $X^\ominus$ represents an anion.

* * * * *